J. BIJUR.
LUBRICATING DEVICE FOR DYNAMOS AND THE LIKE.
APPLICATION FILED NOV. 29, 1915.

1,349,871.

Patented Aug. 17, 1920.
2 SHEETS—SHEET 1.

INVENTOR
Joseph Bijur
BY
Emery, Booth, Janney & Varney
ATTORNEYS

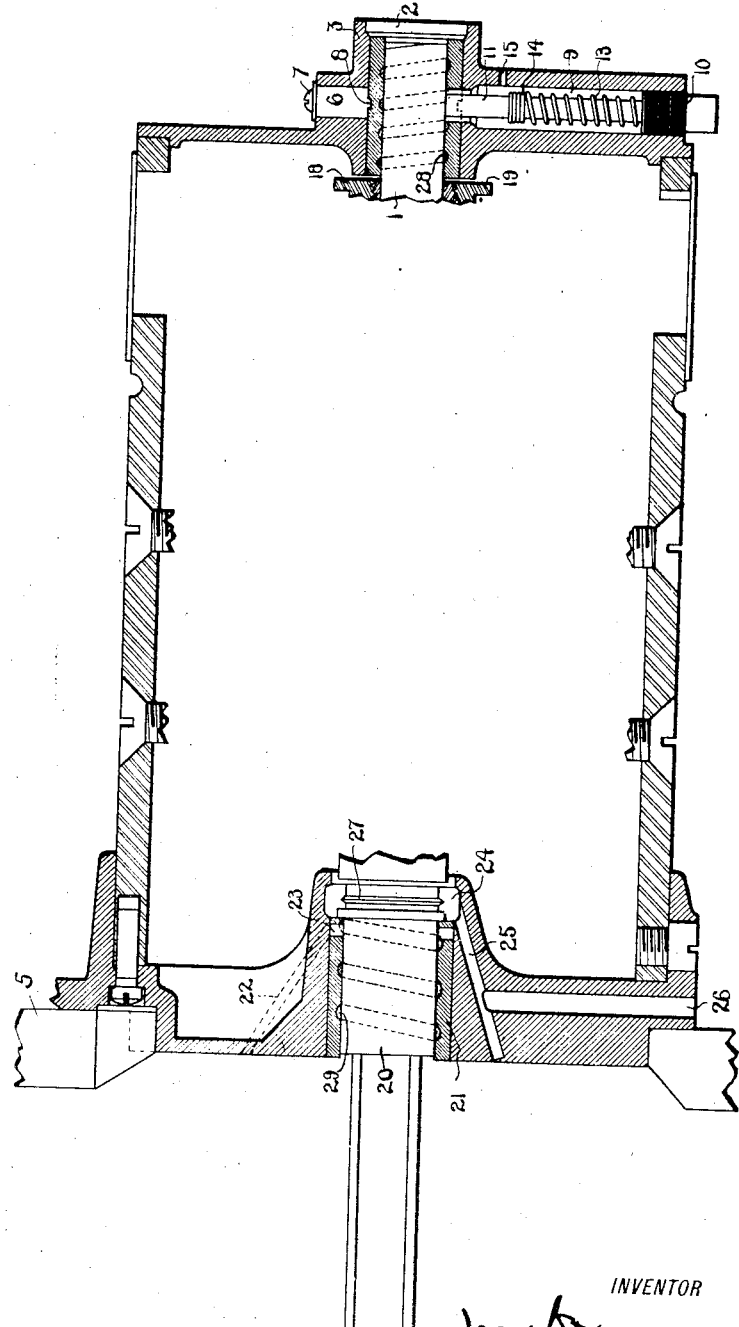

UNITED STATES PATENT OFFICE.

JOSEPH BIJUR, OF NEW YORK, N. Y., ASSIGNOR, BY MESNE ASSIGNMENTS, TO BIJUR MOTOR APPLIANCE COMPANY, A CORPORATION OF DELAWARE.

LUBRICATING DEVICE FOR DYNAMOS AND THE LIKE.

1,349,871.    Specification of Letters Patent.    Patented Aug. 17, 1920.

Application filed November 29, 1915. Serial No. 63,951.

*To all whom it may concern:*

Be it known that I, JOSEPH BIJUR, a citizen of the United States, and a resident of the borough of Manhattan, in the city, county, and State of New York, have invented an Improvement in Lubricating Devices for Dynamos and the like, of which the following is a specification.

This invention relates to lubricating devices for dynamos and the like. One of the objects thereof is to provide simple and practical means for efficiently lubricating a bearing. Another object is to provide means of the above type for dynamo electric machines in which the flow of excess lubricant toward the commutator is effectively prevented. Another object is to provide means of the type last mentioned in which especial care in use is unnecessary. Other objects will be in part obvious and in part pointed out hereinafter.

The invention accordingly consists in the features of construction, combinations of elements and arrangement of parts which will be exemplified in the structure hereinafter described, and the scope of the application of which will be indicated in the following claims.

In the accompanying drawings in which is shown one of the various possible embodiments of this invention, Figure 1 is an end view of a dynamo, certain parts being broken away in order to show the structure more clearly.

Fig. 3 is a longitudinal central section of the dynamo taken along the line A—A extended, and the interior portions of the dynamo being broken away.

Similar reference characters refer to similar parts throughout all views of the drawings.

Figure 1:
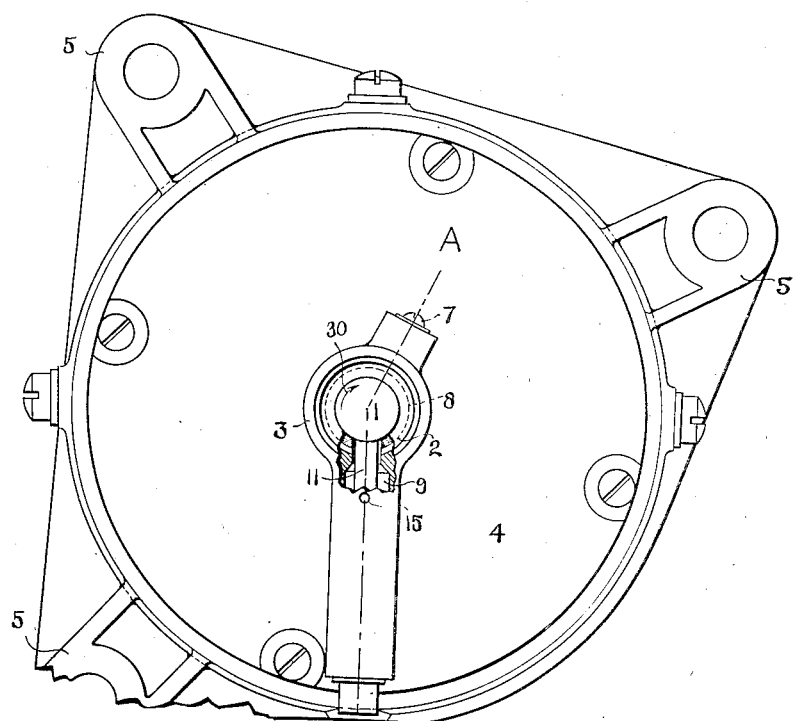

Referring now to Fig. 1 of the drawings, there is indicated the end or head of a dynamo in which is journaled the armature shaft 1 in a suitable bearing 2. This bearing or lining 2 is mounted in the journal box 3 which is preferably formed integral with the dynamo head 4. The dynamo is preferably supported in a horizontal position as by means of the wings 5 at its opposite end, shown in Fig. 1 of the drawings.

Figure 2:
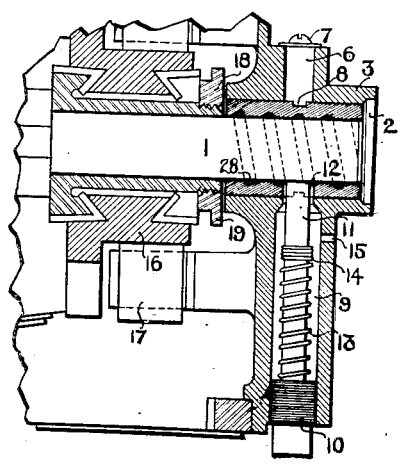
Fig. 2 is a sectional view taken along the line A—A of Fig. 1.

Referring now to Fig. 2, the box 3 is provided with a feed passage 6 which may be closed by any suitable form of closure diagrammatically indicated at 7. From the passage 6 the lubricant is led through a passage 8 which may be formed by a groove in the outer surface of the bearing 3 or the inner surface of the journal box. This groove extends about the bearing to its lower side and the lubricant is led to a reservoir or chamber 9 which may be formed in the head of the dynamo. The lower end of this reservoir is closed as by a screw plug 10 and a suitable wick 11 leads from this reservoir upwardly through the opening 12 in the bearing to contact the journal of the shaft 1. This wick is urged upwardly as by the spring 13 resting at its lower end against the plug 10 and secured as at 14 to the wick.

At a point adjacent the upper end of the reservoir 9 is an opening 15 leading outwardly through the walls thereof.

Mounted upon the shaft 1 is a dynamo commutator 16 co-acting in the usual way with brushes 17, and secured to the bushing of this commutator adjacent the bearing is a ring 18 provided with a flange 19.

As shown in Fig. 3 of the drawings, the shaft 1 at the opposite end of the dynamo, is enlarged as at 20 and rests within a bearing 21. This bearing is lubricated through a passage indicated in dotted lines at 22 leading to an opening 23 through the lining of the bearing box to the journal. Excess lubricant passes into the annular chamber 24 and thence by means of the inclined passage 25 and downward passage 26 is carried away. Creeping of the lubricant along the shaft is positively prevented by the centrifugal action of the outwardly extending ring or shoulder 27.

Formed within the linings of both bearings of the shaft are spiral grooves 28 and 29. These grooves are provided with a graphite filling and aid in the lubrication of the journals. It is to be especially noted that these spirals are formed in an opposite direction in the two bearings, and that this direction is such with respect to the direction of drive of the armature shaft, as indicated by the arrow 30 in Fig. 1 of the drawings, as to tend to work any excess lubricant outwardly away from the body of the machine. In other words, the bearing lining being held in position, and the journal rotated therein, in each case this spiral is so formed that any particle of lubricant on the journal is urged toward the adjacent end of the shaft by the spiral fillings.

The action of the above described apparatus is substantially as follows. The lubricant is fed freely to the passage 6 and is transmitted as above described to the reservoir 9 wherein it may accumulate in liquid or semi-liquid form. As it is necessary to keep a journal of this nature well lubricated on account of its high speed, the parts should receive ample oiling, and it is of course inconvenient to ascertain previously the amount of oil which is already available therein. In this case the lubricant is freely applied and when it reaches a level substantially filling the reservoir, it flows outwardly through the opening 15 thus giving evidence that the bearing is amply lubricated and preventing chance of over-lubrication, which is especially to be avoided at points adjacent a dynamo commutator. From the reservoir 9 the lubricant is fed upwardly to the bearing at the desired rate as by the wick 11.

It is to be especially noted that as the end of the groove 8 terminates against the upper end of the wick 11, a certain amount of lubricant is fed directly to the wick substantially at the journal, and is, in effect, applied directly to the bearing. In this manner, if the bearing is urgently in need of lubrication, the oil reaches it almost instantly without having to pass downwardly into the reservoir and be sucked up through the wick.

If by any chance, an excess of lubricant reaches the bearing and travels toward the commutator, it is received by the ring 18 and thrown outwardly by the centrifugal action of the flange 19, thus preventing it from creeping farther to the commutator surface. The action of the spiral grooves is such, as above explained, as to tend to work excess lubricant away from the armature as the shaft is rotated therein.

It will thus be seen that there is provided apparatus in which the objects of this invention are fully achieved.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:

1. In a device of the class described, in combination, a rotary member, a bearing for said member, a reservoir for lubricant extending below said member, said reservoir being provided with a vent hole in its upper portion through which excess lubricant is discharged, and a wick in said reservoir contacting with said rotary member and adapted to transmit lubricant from said reservoir thereto.

2. In a device of the class described, in combination, a rotary member, a bearing for said member provided with an opening in its lower side, a reservoir for lubricant extending downwardly from said opening, said reservoir being provided with a vent below said rotary member to limit the upper level of lubricant in said reservoir, a wick in said reservoir adapted to extend through said opening in said bearing and transmit lubricant from said reservoir to said rotary member, and a removable member closing the lower end of said reservoir.

3. In a device of the class described, in combination, a shaft, a bearing for said shaft, means adapted to lead lubricant to the upper outer side of said bearing, a single reservoir for lubricant, said reservoir extending below said bearing, said parts being shaped to form a passage from said upper side of said bearing around said bearing to said reservoir, and means adapted to feed lubricant from said reservoir to said shaft in said bearing, said reservoir being provided with means adapted to limit the amount of lubricant therein.

4. In a device of the class described, in combination, a rotary member, a bearing for said member, a reservoir for lubricant extending below said member, said reservoir being provided with a vent hole in its upper portion to limit the level of lubricant therein, a wick in said reservoir contacting with said rotary member and adapted to transmit lubricant from said reservoir thereto, and means at one end of said bearing adapted to receive and divert any excess of lubricant therefrom.

5. In a device of the class described, in combination, a shaft, a bearing in which said shaft is journaled provided with an opening on its lower side, a reservoir below said opening, means adapted to lead lubricant to the upper outer side of said bearing, said parts being shaped to form a passage from said point at which lubricant is led to said bearing around said bearing to said reservoir, means adapted to feed lubricant from said reservoir through said bearing to said shaft, and means at one end of said bearing adapted to receive and divert any excess of lubricant therefrom.

6. In apparatus of the class described, in combination, a shaft, a bearing member in which said shaft rotates having an opening extending through the lower side thereof, an absorbent member fitted in said opening and resting against said shaft, and a member in which said bearing member rests, the outer portion of said bearing member being grooved to provide a passage terminating at said opening.

7. In apparatus of the class described, in combination, a shaft, a bearing member in which said shaft rotates, one of said members having formed in its bearing surface a spiral which contacts the opposite surface at points progressively approaching the adjacent end of the shaft with the normal direction of rotation thereof and means for feeding lubricant to said bearing at a point intermediate the ends of said spiral.

8. In apparatus of the class described, in combination, a dynamo electric machine having its armature shaft provided with bearings adjacent its ends, bearing members in which said shaft is journaled at said points, and a spiral formed in the bearing surface of each bearing and shaped in a direction to contact the opposing bearing surface at points progressively approaching the respective ends of the shaft in the normal direction of rotation thereof, whereby excess lubricant is urged at each end of the machine in a direction away from the armature thereof and a wick for feeding lubricant to said bearing at a point intermediate the ends of each spiral.

In testimony whereof, I have signed my name to this specification this fifteenth day of November, 1915.

JOSEPH BIJUR.